United States Patent
Parla et al.

(10) Patent No.: US 12,335,147 B2
(45) Date of Patent: Jun. 17, 2025

(54) ADAPTIVE CLOUD-NATIVE SERVICE CHAINING

(71) Applicant: Cisco Technology, Inc., San Jose, CA (US)

(72) Inventors: Vincent E. Parla, North Hampton, NH (US); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 17/529,098

(22) Filed: Nov. 17, 2021

(65) Prior Publication Data

US 2023/0155941 A1     May 18, 2023

(51) Int. Cl.
*H04L 47/125* (2022.01)
*H04L 43/0852* (2022.01)
*H04L 47/2466* (2022.01)

(52) U.S. Cl.
CPC ........ *H04L 47/125* (2013.01); *H04L 43/0852* (2013.01); *H04L 47/2466* (2013.01)

(58) Field of Classification Search
CPC ............... H04L 41/125; H04L 43/0852; H04L 47/2466; H04L 41/0806; H04L 41/046; H04L 41/0895; H04L 43/20; H04L 41/0894; H04L 41/147; H04L 41/0823
See application file for complete search history.

(56) References Cited

U.S. PATENT DOCUMENTS

| | | | |
|---|---|---|---|
| 2015/0003453 A1* | 1/2015 | Sengupta | H04L 67/63 370/392 |
| 2015/0163150 A1* | 6/2015 | Beheshti-Zavareh | H04L 45/0377 370/400 |
| 2016/0182380 A1* | 6/2016 | Mehra | H04L 47/125 709/226 |
| 2017/0126792 A1 | 5/2017 | Halpern et al. | |
| 2017/0302470 A1* | 10/2017 | Clark | H04L 41/0895 |
| 2019/0149441 A1 | 5/2019 | Pignataro et al. | |
| 2020/0076717 A1 | 3/2020 | Rantzau et al. | |
| 2020/0153701 A1* | 5/2020 | Mohan | H04L 41/5009 |
| 2021/0136133 A1 | 5/2021 | Ithal et al. | |

(Continued)

*Primary Examiner* — Syed Ali
*Assistant Examiner* — Najeeb Ansari
(74) *Attorney, Agent, or Firm* — Lee & Hayes, P.C.

(57) ABSTRACT

Techniques for a computing resource network to send a packet through a processing flow (e.g., a service chain) according to an order of processing workloads (e.g., services) included in the processing flow, configured as an optimized service chain. In some examples, the computing resource network may include a policy evaluation engine configured to determine the best probabilistic outcome of an order of routing between the services that results in the lowest computational costs based on the probability that a given packet will be terminated/modified at one of the earlier processing workloads in the service chain, a prediction engine configured to determine the order of the processing workloads included in the processing flow based on a policy and/or telemetry data associated with the processing workloads, and/or an intelligent routing engine configured to route a packet between the one or more processing workloads included in a processing flow according to the order.

20 Claims, 8 Drawing Sheets

(56) References Cited

U.S. PATENT DOCUMENTS

| | | | |
|---|---|---|---|
| 2023/0024892 A1* | 1/2023 | de Oliveira Barbalho | ................... H04L 47/762 |
| 2023/0114682 A1* | 4/2023 | Bharti | ................... H04L 67/562 370/392 |

* cited by examiner

ADAPTIVE CLOUD-NATIVE SERVICE CHAINING

TECHNICAL FIELD

The present disclosure relates generally to applying an ordered service-chain to cloud-native workloads to optimize the transit of packets through the service chain.

BACKGROUND

Service providers offer computing-based services, or solutions, to provide users with access to computing resources to fulfill users' computing resource needs without having to invent in and maintain computing infrastructure required to implement the services. These service providers often maintain networks of data centers which house servers, routers, and other devices that provide computing resources to users such as compute resources, networking resources, storage resources, database resources, application resources, security resources, and so forth. The solutions offered by service providers may include a wide range of services that may be fine-tuned to meet a user's needs. Additionally, in cloud-native environments, it is common to operationalize different services such that they execute in separate workloads and/or containers. While there may be mechanisms to configure communications between workloads, there is a need to dynamically deliver these services in an ordered manner.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
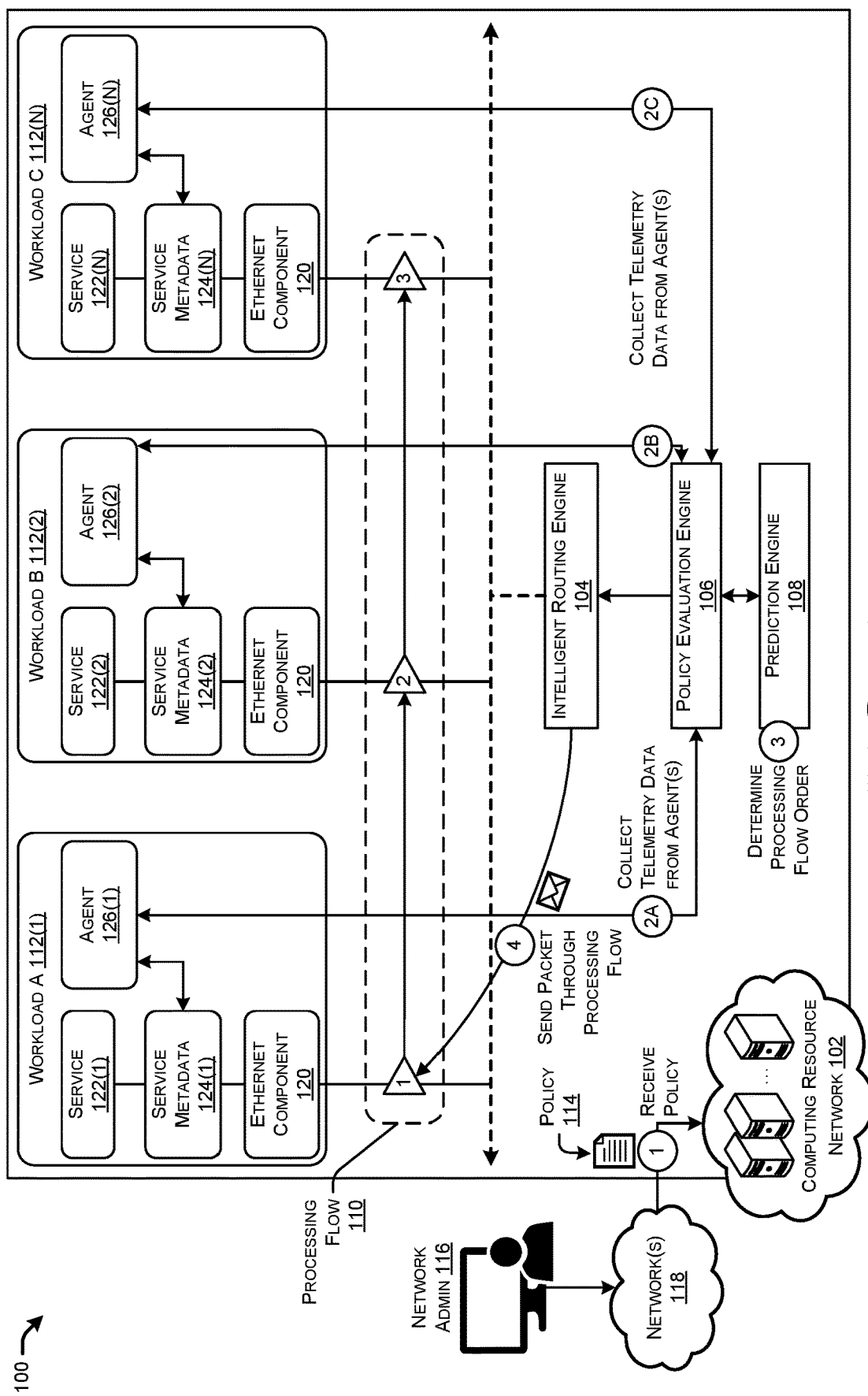
FIG. 1A illustrates a system-architecture diagram of an example flow for a computing resource network, including an intelligent routing engine, to send a packet through a cloud-native processing flow according to a processing flow order determined by a prediction engine and/or a policy evaluation engine.

This disclosure describes a method for an intelligent routing engine to send a packet through a processing flow according to an order for one or more processing workloads of the processing flow determined based on a likelihood that the packet will terminate and/or be modified (e.g., pre-processing the packet for a later workload) at the respective processing workloads. The method includes determining that a packet will enter a processing flow comprising one or more processing workloads to be performed on the packet. Additionally, or alternatively, the method includes determining a first likelihood that the packet will terminate and/or be modified at a first processing workload of the one or more processing workloads. Additionally, or alternatively, the method includes determining a second likelihood that the packet will terminate and/or be modified at a second processing workload of the one or more processing workloads. Additionally, or alternatively, the method includes determining an order for the first processing workload and the second processing workload in the processing flow based at least in part on the first likelihood and the second likelihood. Additionally, or alternatively, the method includes sending the packet through the processing flow.

Additionally, or alternatively, the method includes identifying a policy associated with a packet that will enter a processing flow comprising one or more processing workloads to be performed on the packet, the policy indicating a first likelihood that the packet will terminate and/or be modified at a first processing workload of the one or more processing workloads and a second likelihood that the packet will terminate and/or be modified at a second processing workload of the one or more processing workloads. Additionally, or alternatively, the method includes determining an order for the first processing workload and the second processing workload in the processing flow based at least in part on the first likelihood and the second likelihood. Additionally, or alternatively, the method includes sending, based at least in part on the order, the packet to the first processing workload.

Additionally, the techniques described herein may be performed by a system and/or device having non-transitory computer-readable media storing computer-executable instructions that, when executed by one or more processors, performs the method described above.

Example Embodiments

This disclosure describes techniques for a computing resource network to send a packet through a processing flow (e.g., a service chain) according to an order of processing workloads (e.g., services) included in the processing flow, configured as an optimized service chain. In some examples, the computing resource network may include a policy evaluation engine, a prediction engine, and/or an intelligent routing engine. The policy evaluation engine may be configured to determine the best probabilistic outcome of a particular order of routing between the services that results in the lowest computational costs based on the probability that a given packet will be terminated and/or modified (e.g., pre-processing the packet for a subsequent workload) by one of the earlier processing workloads in the service chain. In some examples, the policy evaluation engine may utilize a prediction engine to determine the order. For example, the prediction engine may be configured to determine the order of the processing workloads included in the processing flow based on a user-defined policy associated with the processing workloads and/or telemetry data associated with the processing workloads. Additionally, or alternatively, the intelligent routing engine may be configured to route a packet between the one or more processing workloads included in a processing flow according to a dynamic order of the processing workloads determined by the policy evaluation engine and/or the prediction engine.

As previously described, the policy evaluation engine may determine the best probabilistic order for the service chain by utilizing a prediction engine configured to determine the order of the processing workloads included in the processing flow based on a user-defined policy associated with the processing workloads and/or telemetry data associated with the processing workloads. In some examples, the user-defined policy may be configured by a network administrator and/or a user configured to establish network policies. Additionally, or alternatively, the individual processing workloads included in a processing flow may have respective agents executing thereon collecting data (e.g., telemetry data) and reporting the data back to the policy evaluation engine. In some examples, a user-defined policy, the telemetry data, and/or a combination of both may be utilized to configure the order of the service chain for maximum optimization.

In some examples, a user-defined policy may include, but is not limited to, a user-defined order of the processing workloads, a likelihood that a packet will terminate at a processing workload, a likelihood that a packet will be modified and/or pre-processed by a processing workload, and the like. Additionally, or alternatively, the telemetry data may provide an indication of how often a packet terminates and/or is modified at a processing workload (e.g., a number of times a packet has terminated and/or been modified at a particular processing workload, a percentage indicating how often a packet may be terminated and/or modified at a particular processing workload, etc.).

As previously described, the computing resource network may be implemented as a cloud-native computing resource environment. In some examples, the processing workloads of the cloud-native computing resource environment may be configured as cloud-based service, such as (but not limited to), for example, an intrusion prevention system (IPS) service, a next-generation firewall (NGFW) service, a web application firewall (WAF) service, and the like. Additionally, or alternatively, the computing resource network may include a programmable network interface controller (NIC), such as, for example, a SmartNIC and/or a programmable switch (e.g., a P4 switch). In some examples, the programmable NIC may execute a processing pipeline thereon, such as, for example, a P4 processing pipeline or the like, and the processing workloads of the computing resource network may be configured as functions of the processing pipeline.

Additionally, or alternatively, in examples where the computing resource network is configured as a cloud-native computing resource environment, a packet may contain sensitive data requiring the processing flow to be secured using certain protocols and/or encryptions to protect the data contained in the packet, such as, for example, transport layer security (TLS) encryption. To send a packet through a TLS flow a TLS inspection proxy operationalized in the cloud may be utilized to perform a per-flow decryption only once, instead of performing a decryption at each processing workload of the processing flow. For example, once received, a decryption may be performed on the packet and the packet may then be sent into the processing flow where the one or more processing workloads may be performed on the packet before performing a re-encryption of the packet. In this way, separate services executing independently via separate processing workloads may be performed on the packet while only performing one decryption and/or encryption for the entire flow.

Take, for example, a computing resource environment including a policy evaluation engine, a prediction engine, and/or and intelligent routing engine configured to route a packet through a processing flow including one or more workloads. In some examples, the packet transmission may be initiated by a user associated with an enterprise. A network admin associated with the enterprise may configure various policies for packet transmissions associated with users of the enterprise. For example, a user-defined policy may include an indication of a processing flow including one or more workloads to be performed on the packet and/or an order of the one or more workloads in the processing flow. Additionally, or alternatively, the policy may include, for each workload included in the processing flow, an indication of a probability that a packet will terminate at a respective workload. In some examples, the policies may be based on a type of packet, a role of a user, data associated with the workload(s), and/or feedback received from the computing resource network.

Additionally, or alternatively, the policy may include, for each workload included in the processing flow, an indication of a probability that a packet will be modified by a respective workload. For example, a first workload may be configured to modify a packet before a second workload processes the packet. In some examples, the first workload may pre-process the packet, such as, for example, including metadata in the packet and/or tagging the packet, which the second workload may utilize to properly process the packet and/or process the packet in a more efficient manner. In some examples, the pre-processing of a packet may result in the likelihood that a packet will terminate at a subsequent workload being reduced.

For example, a processing flow may include three processing workloads (workload A, workload B, and workload C). It should be appreciated that a processing flow may include any number of processing workloads, and the three processing workloads of the processing flow as discussed herein is merely exemplary. Workload A may comprise a service configured as a NGFW service, workload B may comprise a service configured as a IPS service, and/or workload C may comprise a service configured as a WAF service. The service(s) offered by these workload(s) included in the processing flow may be configured as a service chain. Traditionally, in cloud-native environments, these services may be chained together in a relatively static nature, meaning, for example, that a packet may traverse these services in the same order (e.g., workload A first, workload B second, and then workload C last). However, when the network admin applies a user-defined policy to the computing resource network, and optimized processing flow may be determined.

For example, the computing resource network may receive a user-defined policy indicating at least a first probability that the packet will terminate and/or be modified at workload A, a second probability that the packet will terminate and/or be modified at workload B, and/or a third probability that the packet will terminate and/or be modified at workload C. In some examples, the policy evaluation engine, using the prediction engine, may then utilize the policy to determine the best probabilistic outcome of a particular order of routing between the workloads offering services that results in the lowest computational costs based on the respective probabilities that a given packet will be terminated and/or modified by one of the earlier workloads in the processing flow. For example, the policy evaluation engine, utilizing the prediction engine, may determine that the third probability that the packet will terminate at workload C is greater than the first probability and/or the second probability. Additionally, or alternatively, the policy evaluation engine, using the prediction engine, may determine that the third probability that the packet will be modified at workload C is less than the first probability and/or the second probability. Accordingly, the policy evaluation engine may configure the processing flow such that workload C may be the last workload that the packet will be routed to in the processing flow. Additionally, or alternatively, the policy evaluation engine, utilizing the prediction engine, may determine that the second probability is greater than and/or less than (in modification scenarios) the first probability. Accordingly, the policy evaluation engine, using the prediction engine, may configure the processing flow such that workload A may be the first workload and workload B may be the second workload that the packet will be routed to in the processing flow. As such, the policy evaluation engine may determine the order of routing through the processing flow such that the packet is to be sent first to workload A, then to workload B, and then to workload C.

Additionally, or alternatively, as previously described, the computing resource network may collect telemetry data from an agent executing on the respective workloads associated with a processing flow. In some examples, the telemetry data may indicate a number of packets that have terminated and/or been modified at a given workload, a percentage of packets that have terminated at a given workload, a percentage of packets that have been modified by a given workload, a latency associated with a given workload (e.g., an amount of time taken by the workload to process the packet), or the like. In some examples, a first agent executing on workload A may collect telemetry data indicating a number of packets that have terminated and/or been modified at workload A, a second agent executing on workload B may collect telemetry data indicating a number of packets that have terminated and/or been modified at workload B, and/or a third agent executing on workload C may collect telemetry data indicating a number of packets that have terminated and/or been modified at workload C. In some examples, the policy evaluation engine, using the prediction engine, may utilize the telemetry data to determine the best probabilistic outcome of a particular order of routing between the workloads offering services that results in the lowest computational costs. In some examples, the telemetry data may be considered in view of a user-defined policy such that an order indicated by a user-defined policy may be changed based on the telemetry data.

In some examples, the order of routing through the processing flow may have been previously configured such that the packet is to be sent first to workload A, then to workload B, and finally to workload C. However, the policy evaluation engine, using the prediction engine, may determine that the telemetry data indicates that the number of packets that have terminated at workload A is greater than the number of packets that have terminated at workload B and/or the number of packets that have terminated at workload C. Additionally, or alternatively, the policy evaluation engine, using the prediction engine, may determine that the telemetry data indicates that the number of packets that have been modified at workload A is less than the number of packets that have been modified by workload B and/or the number of packets that have been modified by workload C. In some examples, the policy evaluation engine, using the prediction engine, may determine that the number of packets that have terminated and/or been modified at workload B and the number of packets that have terminated and/or been modified at workload C are substantially similar (e.g., the difference is not significant enough to overwrite the user-defined policy). Accordingly, the policy evaluation engine may determine the order of routing through the processing flow such that the packet is to be sent first to workload B, then to workload C, and then to workload A.

Once the processing flow order has been determined by the policy evaluation engine, the intelligent routing engine may then utilize the processing flow order to route the packet through the processing flow such that the packet is sent to the respective workloads according to the processing flow order. At each workload, a service may be performed on the packet before being routed to the next workload in the processing flow. Additionally, or alternatively, a packet may be modified at any given workload before being routed to the next workload in the processing flow.

As described herein, a computing-based, cloud-based solution, processing workload, pipeline function, and/or service can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. Additionally, or alternatively, the techniques are generally applicable for any network of physical devices. In some instances, the techniques may be performed by a scheduler or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to applying an ordered service chain to cloud-native workloads. For instance, the techniques described herein may determine respective probabilities that a given packet will be terminated at each processing workload of a processing flow. By determining the respective probabilities, the best probabilistic outcome of a particular order of routing between workloads may be determined, resulting in the lowest computational costs of sending the packet through the processing flow. Additionally, or alternatively, by utilizing user-defined policies, a network administrator may explicitly configure such an order. Further, by collecting telemetry data from agents executing on respective workloads of the processing flow, the order of the processing flow may be changed if it is determined that one of the processing workloads is terminating a significant number of packets. Additionally, or alternatively, when sending a packet through a TLS flow, a TLS inspection proxy operationalized in the cloud may be utilized to perform a per-flow decryption only once, instead of performing a decryption at each processing workload of the processing flow.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
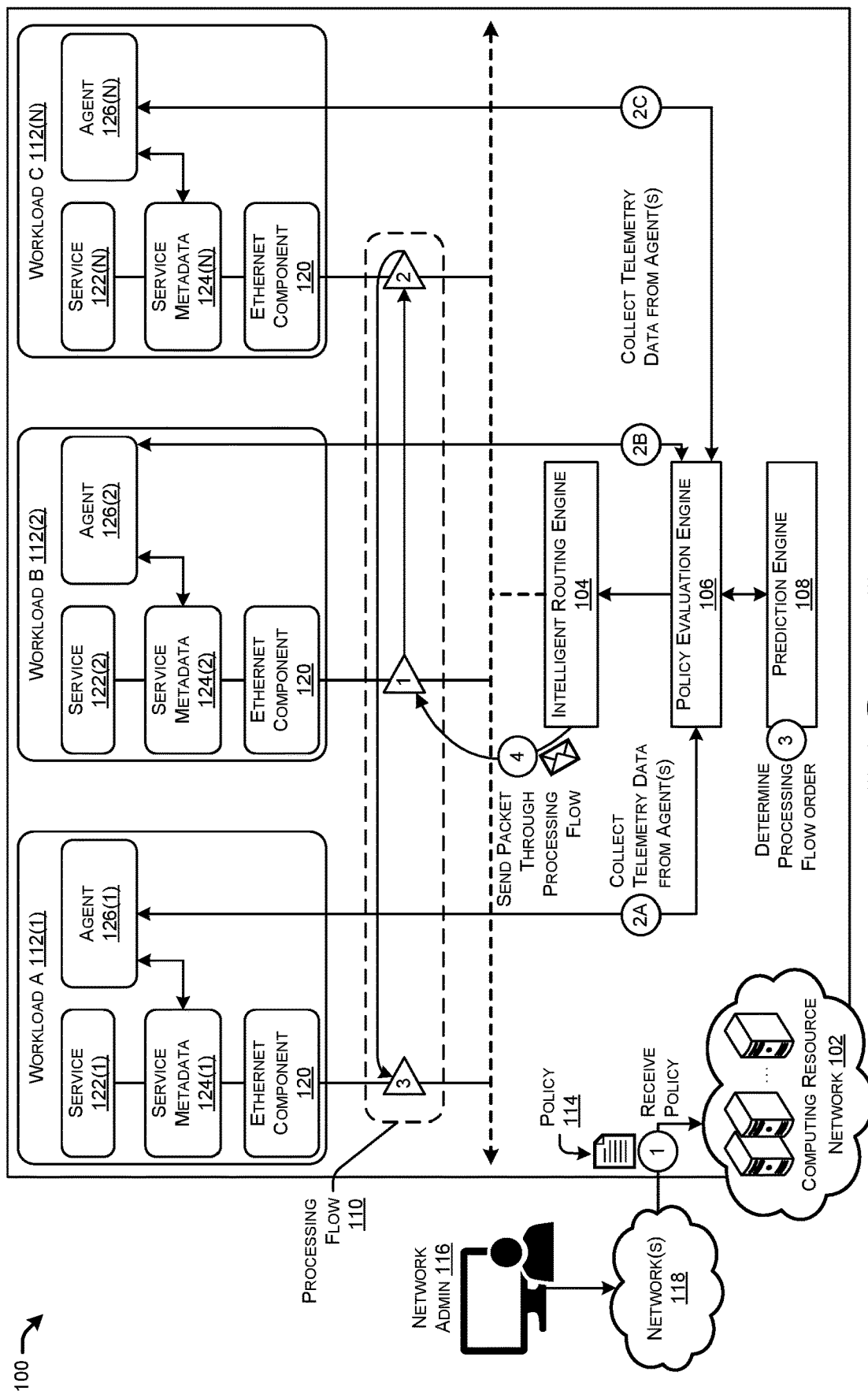
FIG. 1B illustrates a system-architecture diagram of another example flow for a computing resource network, including an intelligent routing engine, to send a packet through a cloud-native processing flow according to a processing flow order determined by a prediction engine and/or a policy evaluation engine.

FIGS. 1A and 1B illustrate an example system-architecture diagram 100 and an example flow for a computing resource network 102 including an intelligent routing engine 104, a policy evaluation engine 106, and/or a prediction engine 108 to determine an order for routing a packet through a processing flow 110 including one or more workloads 112(1)-(N) (where N may be any integer greater than 1). In some examples, the order for routing the packet through the processing flow 110 may be based at least in part on a user-defined policy 114 received from a network administrator 116 over one or more network(s) 118.

FIG. 1A illustrates an example system-architecture diagram 100 and an example flow for a computing resource network 102 including an intelligent routing engine 104, a policy evaluation engine 106, and/or a prediction engine 108 to determine the order for routing the packet through the processing flow 110 based at least in part on a user-defined policy 114 received from a network administrator 116 over one or more network(s) 118.

The computing resource network 102 may comprise one or more data centers that include various networking components, such as, a Software-Defined-Networking (SDN) controller, spine network switches, and network switches (also referred to as nodes) operating on physical servers. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, workload A 112(1), workload B 112(2), and/or workload C 112(N). In some examples, the workloads 112(1)-(N) may be hosted on the same physical server and/or on separate physical server(s).

Each of the individual workloads 112 may comprise various components, such as, for example, an ethernet component 120, a service 122, a service metadata component 124, and/or an agent 126. In some examples, the ethernet component 120 may be configured to deliver a packet from the intelligent routing engine to a workload 112. In some examples, a workload 112 may be configured to provide a service 122 for and/or perform a service 122 on a packet, such as (but not limited to), for example, an intrusion prevention system (IPS) service, a next-generation firewall (NGFW) service, a web application firewall (WAF) service, and the like. In some examples, the service metadata component 124 may store metadata associated with the service 122 such as the number of packets that have terminated at the workload 112, for example. In some examples, the agent 126 may be configured to send telemetry data, including the metadata stored in the service metadata component 124, to the policy evaluation engine 106.

Take, for example, a packet transmission initiated by a user associated with an enterprise. A network admin 116 associated with the enterprise may configure various policies 114 for packet transmissions associated with users of the enterprise. For example, a user-defined policy 114 may include an indication of a processing flow 110 including one or more workloads 112 to be performed on the packet and/or an order of the one or more workloads 112 in the processing flow 110. Additionally, or alternatively, the policy 114 may include, for each workload 112 included in the processing flow 110, an indication of a probability that a packet will terminate at and/or be modified by a respective workload 112. In some examples, the policies 114 may be based on a type of packet, a role of a user, data associated with the workload(s) 112, and/or feedback received from the computing resource network 102. While the flow described below pertains to a packet terminating at a processing workload, the flow may be implemented and based on a packet being modified by a processing workload.

For example, a processing flow 110 may include three processing workloads 112 (workload A 112(1), workload B 112(2), and workload C 112(N)). It should be appreciated that a processing flow 110 may include any number of processing workloads 112, and the three processing workloads 112 of the processing flow 110 as discussed herein is merely exemplary. Workload A 112(1) may comprise a service 122(1) configured as a NGFW service, workload B 112(2) may comprise a service 122(2) configured as a IPS service, and/or workload C 112(N) may comprise a service 122(N) configured as a WAF service. The service(s) 122 offered by these workload(s) 112 included in the processing flow 110 may be configured as a service chain. Traditionally, in cloud-native environments, these services 122 may be chained together in a relatively static nature, meaning, for example, that a packet may traverse these services 122 in the same order (e.g., workload A 112(1) first, workload B 112(2) second, and then workload C 112(N) last). However, when the network admin 116 applies a user-defined policy 114 to the computing resource network 102, and optimized processing flow 110 may be determined.

At "1," a network admin 116 may send a policy 114 over one or more network(s) 118 to a computing resource network 102. In some examples, the policy 114 may be received by the policy evaluation engine 106. In some examples, the user-defined policy 114 may indicate at least a first probability that the packet will terminate at workload A 112(1), a second probability that the packet will terminate at workload B 112(2), and/or a third probability that the packet will terminate at workload C 112(N). In some examples, the flow may proceed from "1" to "2A." Additionally, or alternatively, the flow may proceed from "1" to "3."

At "2A," the policy evaluation engine 106 may collect telemetry data from a first agent 126(1) executing on workload A 112(1). In some examples, the telemetry data may include information from the service metadata component 124(1) storing metadata associated with the service 122(1) provided by workload A 112(1). In some examples, the service metadata component 124(1) may provide an indication of how often a packet terminates at workload A 112(1) (e.g., a number of times a packet has terminated at workload A 112(1), a percentage indicating how often a packet may be terminated at workload A 112(1), etc.).

At "2B," the policy evaluation engine 106 may collect telemetry data from a second agent 126(2) executing on workload B 112(2). In some examples, the telemetry data may include information from the service metadata component 124(2) storing metadata associated with the service 122(2) provided by workload B 112(2). In some examples, the service metadata component 124(2) may provide an indication of how often a packet terminates at workload B 112(2) (e.g., a number of times a packet has terminated at workload B 112(2), a percentage indicating how often a packet may be terminated at workload B 112(2), etc.).

At "2C," the policy evaluation engine 106 may collect telemetry data from a third agent 126(N) executing on workload C 112(N). In some examples, the telemetry data may include information from the service metadata component 124(N) storing metadata associated with the service 122(N) provided by workload C 112(N). In some examples, the service metadata component 124(N) may provide an indication of how often a packet terminates at workload C 112(N) (e.g., a number of times a packet has terminated at workload C 112(N), a percentage indicating how often a packet may be terminated at workload C 112(N), etc.).

At "3," the policy evaluation engine 106 may use a prediction engine 108 to determine an order for routing the packet through the processing flow 110. In some examples, the policy evaluation engine 106 and/or the prediction engine 108 may determine the order based on the policy 114, the telemetry data collected from the agents 126, and/or a combination of the two.

In some examples, the policy evaluation engine 106, using the prediction engine 108, may then utilize the policy 114 to determine the best probabilistic outcome of a particular order of routing between the workloads 112 offering the services 122 that results in the lowest computational costs based on the respective probabilities that a given packet will be dropped by one of the earlier workloads 112 in the processing flow 110. For example, the policy evaluation engine 106, utilizing the prediction engine 108, may determine that the third probability that the packet will terminate at workload C 112(N) is greater than the first probability and/or the second probability. Accordingly, the policy evaluation engine 106, using the prediction engine 108, may configure the order of the processing flow 110 such that workload C 112(N) may be the last workload 112 that the packet will be routed to in the processing flow 110. Additionally, or alternatively, the policy evaluation engine 106, utilizing the prediction engine 108, may determine that the second probability is greater than the first probability. Accordingly, the policy evaluation engine 106, using the prediction engine 108, may configure the processing flow 110 such that workload A 112(1) may be the first workload and workload B 112(2) may be the second workload that the packet will be routed to in the processing flow 110. As such, the policy evaluation engine 106 may determine the order of routing through the processing flow 110 such that the packet is to be sent first to workload A 112(1), then to workload B 112(2), and then to workload C 112(N). In some examples, the telemetry data may be considered in view of a user-defined policy 114 such that an order indicated by a user-defined policy 114 may be changed based on the telemetry data, as described with respect to FIG. 1B.

At "4," the intelligent routing engine 104 may then utilize the processing flow order to route the packet through the processing flow 110 such that the packet is sent to the respective workloads 112 according to the processing flow order 110 (e.g., first to workload A 112(1), second to workload B 112(2), and last to workload C 112(N)). At each workload 112, a service 122 may be performed on the packet before being routed to the next workload 112 in the processing flow 110.

FIG. 1B illustrates an example system-architecture diagram 100 and another example flow for a computing resource network 102 including an intelligent routing engine 104, a policy evaluation engine 106, and/or a prediction engine 108 to determine a first order for routing the packet through the processing flow 110 based at least in part on the user-defined policy 114 and a second order for routing the packet through the processing flow 110 based at least in part on the telemetry data collected from the agents 126 executing on the respective workloads 112. In some examples, the computing resource network 102 may correspond to the computing resource network 102 as described with respect to FIG. 1A.

As previously described with respect to FIG. 1A, a packet transmission may be initiated by a user associated with an enterprise. A network admin 116 associated with the enterprise may configure various policies 114 for packet transmissions associated with users of the enterprise. For example, a user-defined policy 114 may include an indication of a processing flow 110 including one or more workloads 112 to be performed on the packet and/or an order of the one or more workloads 112 in the processing flow 110. Additionally, or alternatively, the policy 114 may include, for each workload 112 included in the processing flow 110, an indication of a probability that a packet will terminate at and/or be modified by a respective workload 112. In some examples, the policies 114 may be based on a type of packet, a role of a user, data associated with the workload(s) 112, and/or feedback received from the computing resource network 102. While the flow described below pertains to a packet terminating at a processing workload, the flow may be implemented and based on a packet being modified by a processing workload.

For example, a processing flow 110 may include three processing workloads 112 (workload A 112(1), workload B 112(2), and workload C 112(N)). It should be appreciated that a processing flow 110 may include any number of processing workloads 112, and the three processing workloads 112 of the processing flow 110 as discussed herein is merely exemplary. Workload A 112(1) may comprise a service 122(1) configured as a NGFW service, workload B 112(2) may comprise a service 122(2) configured as a IPS service, and/or workload C 112(N) may comprise a service 122(N) configured as a WAF service. The service(s) 122 offered by these workload(s) 112 included in the processing flow 110 may be configured as a service chain. Traditionally, in cloud-native environments, these services 122 may be chained together in a relatively static nature, meaning, for example, that a packet may traverse these services 122 in the same order (e.g., workload A 112(1) first, workload B 112(2) second, and then workload C 112(N) last). However, when the network admin 116 applies a user-defined policy 114 to the computing resource network 102, and optimized processing flow 110 may be determined.

At "1," a network admin 116 may send a policy 114 over one or more network(s) 118 to a computing resource network 102. In some examples, the policy 114 may be received by the policy evaluation engine 106. In some examples, the user-defined policy 114 may indicate at least a first probability that the packet will terminate at workload A 112(1), a second probability that the packet will terminate at workload B 112(2), and/or a third probability that the packet will terminate at workload C 112(N). In some examples, the flow may proceed from "1" to "2A." Additionally, or alternatively, the flow may proceed from "1" to "3."

At "2A," the policy evaluation engine 106 may collect telemetry data from a first agent 126(1) executing on workload A 112(1). In some examples, the telemetry data may include information from the service metadata component 124(1) storing metadata associated with the service 122(1) provided by workload A 112(1). In some examples, the service metadata component 124(1) may provide an indication of how often a packet terminates at workload A 112(1) (e.g., a number of times a packet has terminated at workload A 112(1), a percentage indicating how often a packet may be terminated at workload A 112(1), an amount of time taken by workload A 112(1) to process the packet, etc.).

At "2B," the policy evaluation engine 106 may collect telemetry data from a second agent 126(2) executing on workload B 112(2). In some examples, the telemetry data may include information from the service metadata component 124(2) storing metadata associated with the service 122(2) provided by workload B 112(2). In some examples, the service metadata component 124(2) may provide an indication of how often a packet terminates at workload B 112(2) (e.g., a number of times a packet has terminated at workload B 112(2), a percentage indicating how often a packet may be terminated at workload B 112(2), an amount of time taken by workload B 112(2) to process the packet, etc.).

At "2C," the policy evaluation engine 106 may collect telemetry data from a third agent 126(N) executing on workload C 112(N). In some examples, the telemetry data may include information from the service metadata component 124(N) storing metadata associated with the service 122(N) provided by workload C 112(N). In some examples, the service metadata component 124(N) may provide an indication of how often a packet terminates at workload C 112(N) (e.g., a number of times a packet has terminated at workload C 112(N), a percentage indicating how often a packet may be terminated at workload C 112(N), an amount of time taken by workload C 112(N) to process the packet, etc.).

At "3," the policy evaluation engine 106 may use a prediction engine 108 to determine an order for routing the packet through the processing flow 110. In some examples, the policy evaluation engine 106 and/or the prediction engine 108 may determine the order based on the policy 114, the telemetry data collected from the agents 126, and/or a combination of the two. In some examples, the policy evaluation engine 106, using the prediction engine 108, may then utilize the policy 114 to determine the best probabilistic outcome of a particular order of routing between the workloads 112 offering the services 122 that results in the lowest computational costs based on the respective probabilities that a given packet will be dropped by one of the earlier workloads 112 in the processing flow 110.

For example, the policy evaluation engine 106, utilizing the prediction engine 108, may determine that the third probability that the packet will terminate at workload C 112(N) is greater than the first probability and/or the second probability. Accordingly, the policy evaluation engine 106, using the prediction engine 108, may configure the order of the processing flow 110 such that workload C 112(N) may be the last workload 112 that the packet will be routed to in the processing flow 110. Additionally, or alternatively, the policy evaluation engine 106, utilizing the prediction engine 108, may determine that the second probability is greater than the first probability. Accordingly, the policy evaluation engine 106, using the prediction engine 108, may configure the processing flow 110 such that workload A 112(1) may be the first workload and workload B 112(2) may be the second workload that the packet will be routed to in the processing flow 110.

As such, the policy evaluation engine 106 may determine a first order of routing through the processing flow 110 such that the packet is to be sent first to workload A 112(1), then to workload B 112(2), and then to workload C 112(N). Additionally, or alternatively, the telemetry data may be considered in view of a user-defined policy 114 such that an order indicated by a user-defined policy 114 may be changed based on the telemetry data.

For example, the policy evaluation engine 106, using the prediction engine 108, may determine that the telemetry data indicates that the number of packets that have terminated at workload A 112(1) is greater than the number of packets that have terminated at workload B 112(2) and/or the number of packets that have terminated at workload C 112(N). Additionally, or alternatively, the policy evaluation engine 106, using the prediction engine 108, may determine that the number of packets that have terminated at workload B 112(2) and the number of packets that have terminated at workload C 112(N) are substantially similar (e.g., the difference is not significant enough to overwrite the user-defined policy 114). Accordingly, the policy evaluation engine 106 may determine a second order of routing through the processing flow 110, in place of the first order, such that the packet is to be sent first to workload B 112(2), then to workload C 112(N), and then to workload A 112(1). Additionally, or alternatively, the order of routing through the processing flow 110 may be changed based on latency and/or any other data indicated by the telemetry data.

At "4," the intelligent routing engine 104 may then utilize the processing flow order to route the packet through the processing flow 110 such that the packet is sent to the respective workloads 112 according to the processing flow order 110 (e.g., first to workload B 112(2), second to workload C 112(N), and last to workload A 112(1)). At each workload 112, a service 122 may be performed on the packet before being routed to the next workload 112 in the processing flow 110.

Figure 2A:
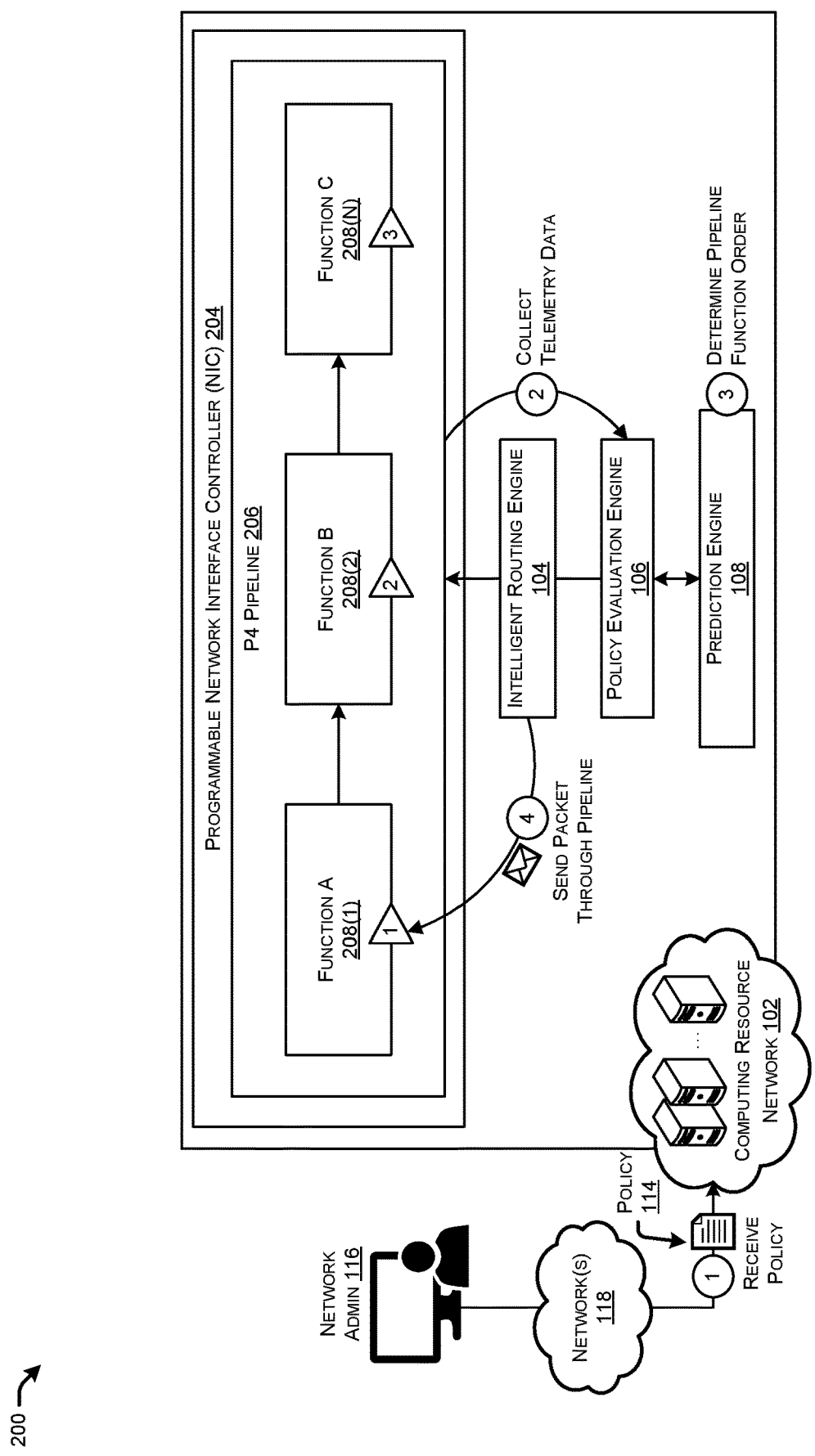
FIG. 2A illustrates a system-architecture diagram of an example flow for a computing resource network, including an intelligent routing engine, to send a packet through a processing pipeline executing on a programmable network interface controller (NIC) according to a pipeline function order determined by a prediction engine and/or a policy evaluation engine.
Figure 2B:
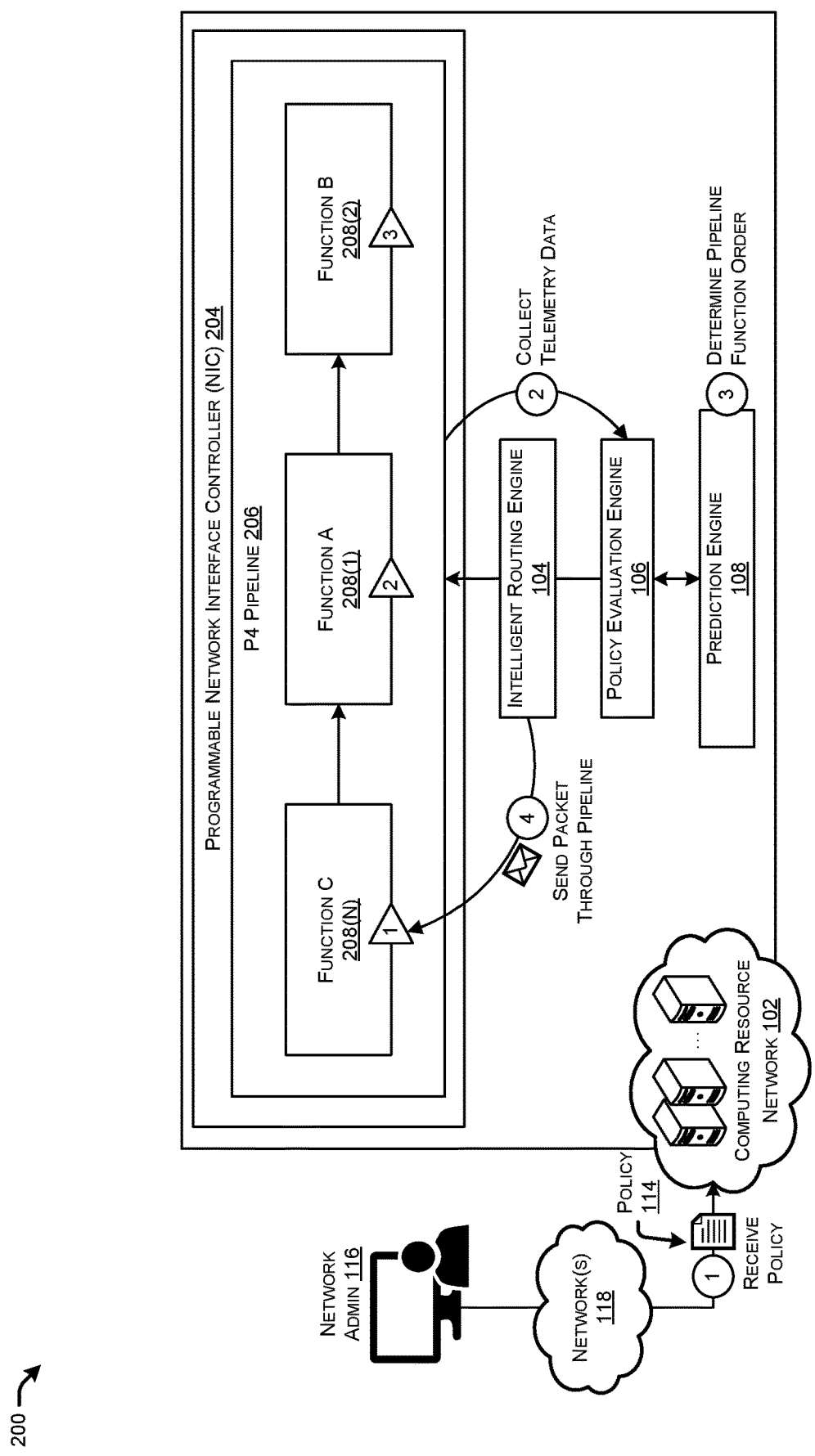
FIG. 2B illustrates a system-architecture diagram of another example flow for a computing resource network, including an intelligent routing engine, to send a packet through a processing pipeline executing on a programmable network interface controller (NIC) according to a pipeline function order determined by a prediction engine and/or a policy evaluation engine.

FIGS. 2A and 2B illustrate a system architecture diagram 200 and example flows for computing resource network 102, including an intelligent routing engine 104, to send a packet through a processing pipeline 206 executing on a programmable network interface controller (NIC) 204 according to a pipeline function order determined by a prediction engine 108 and/or a policy evaluation engine 106. In some examples, the intelligent routing engine 104, the policy evaluation engine 106, and/or the prediction engine 108 108 may correspond to the intelligent routing engine 104, the policy evaluation engine, and/or the prediction engine 108 as described with respect to FIGS. 1A and 1B.

FIG. 2A illustrates a system-architecture diagram 200 of an example flow for a computing resource network 102, including an intelligent routing engine 104, to send a packet through a processing pipeline 206 executing on a programmable NIC 204 according to a pipeline function order determined by a prediction engine 108 and/or a policy evaluation engine 106 based on a user defined policy 114.

The computing resource network 102 may comprise one or more data centers that include various networking components, such as, a Software-Defined-Networking (SDN) controller, spine network switches, and network switches (also referred to as nodes) operating on physical servers. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, a programmable NIC 204 executing a processing pipeline 206 comprising one or more processing functions 208.

Take, for example, a packet transmission initiated by a user associated with an enterprise. In some examples, the packet may contain sensitive data requiring the processing flow to be secured using certain protocols and/or encryptions to protect the data contained in the packet, such as, for example, transport layer security (TLS) encryption. In some examples, the programmable NIC 204 may be utilized to perform a per-flow decryption and/or encryption only once, instead of performing a decryption at each processing workload of the processing flow. For example, once received, a decryption may be performed on the packet and the packet may then be sent into the processing pipeline 206 where the one or more processing functions 208 may be performed on the packet before performing a re-encryption of the packet. In this way, separate services may be performed on the packet while only performing one decryption and/or encryption for the entire flow.

A network admin 116 associated with the enterprise may configure various policies 114 for packet transmissions associated with users of the enterprise. For example, a user-defined policy 114 may include an indication of one or more processing functions 208 to be performed on the packet and/or an order of the one or more processing functions 208 in the processing pipeline 206. Additionally, or alternatively, the policy 114 may include, for each processing function 208 included in the processing pipeline 206, an indication of a probability that a packet will terminate at and/or be modified by a respective function 208. In some examples, the policies 114 may be based on a type of packet, a role of a user, data associated with the function(s) 208, and/or feedback received from the computing resource network 102. While the flow described below pertains to a packet terminating at a processing workload, the flow may be implemented and based on a packet being modified by a processing workload.

For example, a processing pipeline 206 may include three processing functions 208 (function A 208(1), function B 208(2), and function C 208(N)). It should be appreciated that a processing pipeline 206 may include any number of processing functions 208, and the three processing functions 208 of the processing pipeline 206 as discussed herein is merely exemplary. The functions(s) 208 included in the processing pipeline 206 may be configured as a service chain. Traditionally, in cloud-native environments, these functions 208 may be chained together in a relatively static nature, meaning, for example, that a packet may traverse these functions 208 in the same order (e.g., function A 208(1) first, function B 208(2) second, and then function C 208(N) last). However, when the network admin 116 applies a user-defined policy 114 to the computing resource network 102, and optimized processing pipeline 206 may be determined.

At "1," a network admin 116 may send a policy 114 over one or more network(s) 118 to a computing resource network 102. In some examples, the policy 114 may be received by the policy evaluation engine 106. In some examples, the user-defined policy 114 may indicate at least a first probability that the packet will terminate at function A 208(1), a second probability that the packet will terminate at function B 208(2), and/or a third probability that the packet will terminate at function C 208(N). In some examples, the flow may proceed from "1" to "2." Additionally, or alternatively, the flow may proceed from "1" to "3."

At "2," the policy evaluation engine 106 may collect telemetry data from the programmable NIC 204. In some examples, the programmable NIC 204 may include an agent executing thereon configured to collect and send the telemetry data to the policy evaluation engine 106. In some examples, the telemetry data may include metadata associated with the individual function(s) 208 associated with the processing pipeline 206. In some examples, the telemetry data may provide an indication of how often a packet terminates at a given function 208 in the processing pipeline 206 (e.g., a number of times a packet has terminated at a given function 208, a percentage indicating how often a packet may be terminated at a given function, etc.).

At "3," the policy evaluation engine 106 may use a prediction engine 108 to determine an order for the functions 208 in the processing pipeline 206. In some examples, the policy evaluation engine 106 and/or the prediction engine 108 may determine the order based on the policy 114, the telemetry data collected from the programmable NIC 204, and/or a combination of the two.

In some examples, the policy evaluation engine 106, using the prediction engine 108, may then utilize the policy 114 to determine the best probabilistic outcome of a particular order of the functions 208 in the processing pipeline 206 that results in the lowest computational costs based on the respective probabilities that a given packet will be dropped by one of the earlier functions 208 in the processing pipeline 206. For example, the policy evaluation engine 106, utilizing the prediction engine 108, may determine that the third probability that the packet will terminate at function C 208(N) is greater than the first probability and/or the second probability. Accordingly, the policy evaluation engine 106, using the prediction engine 108, may configure the order of the processing pipeline 206 such that function C 208(N) may be the last function 208 that will process the packet in the processing pipeline 206. Additionally, or alternatively, the policy evaluation engine 106, utilizing the prediction engine 108, may determine that the second probability is greater than the first probability. Accordingly, the policy evaluation engine 106, using the prediction engine 108 may configure the processing pipeline 206 such that function A 208(1) may be the first function and function B 208(2) may be the second function that will process the packet in the processing pipeline 206. As such, the policy evaluation engine 106 may determine the order functions 208 in the processing pipeline 206 such that the packet is to be processed first by function A 208(1), then by function B 208(2), and then by function C 208(N). In some examples, the telemetry data may be considered in view of a user-defined policy 114 such that an order indicated by a user-defined policy 114 may be changed based on the telemetry data, as described with respect to FIG. 2B.

At "4," the intelligent routing engine 104 may then configure and/or utilize the processing pipeline 206 to process the packet through the processing pipeline 206 such that the packet is processed by the respective functions 208 according to the processing pipeline order (e.g., first by function A 208(1), second by function B 208(2), and last by function C 208(N)). When the intelligent routing engine 104 sends the packet to the programmable NIC 204, the programmable NIC 204 may then decrypt the packet, process the packet through all of the functions 208 in the processing pipeline 206, and then re-encrypt the packet before returning the packet to the intelligent routing engine 104.

FIG. 2B illustrates a system-architecture diagram 200 of another example flow for a computing resource network 102, including an intelligent routing engine 104, to send a packet through a processing pipeline 206 executing on a programmable NIC 204 according to an updated pipeline function order determined by a prediction engine 108 and/or a policy evaluation engine 106 based on a user defined policy 114 and telemetry data collected from the programmable NIC 204. In some examples, the computing resource network 102 may correspond to the computing resource network 102 as described with respect to FIG. 2A.

Take, for example, a packet transmission initiated by a user associated with an enterprise. In some examples, the packet may contain sensitive data requiring the processing flow to be secured using certain protocols and/or encryptions to protect the data contained in the packet, such as, for example, transport layer security (TLS) encryption. In some examples, the programmable NIC 204 may be utilized to perform a per-flow decryption and/or encryption only once, instead of performing a decryption at each processing workload of the processing flow. For example, once received, a decryption may be performed on the packet and the packet may then be sent into the processing pipeline 206 where the one or more processing functions 208 may be performed on the packet before performing a re-encryption of the packet. In this way, separate services may be performed on the packet while only performing one decryption and/or encryption for the entire flow.

A network admin 116 associated with the enterprise may configure various policies 114 for packet transmissions associated with users of the enterprise. For example, a user-defined policy 114 may include an indication of one or more processing functions 208 to be performed on the packet and/or an order of the one or more processing functions 208 in the processing pipeline 206. Additionally, or alternatively, the policy 114 may include, for each processing function 208 included in the processing pipeline 206, an indication of a probability that a packet will terminate at and/or be modified by a respective function 208. In some examples, the policies 114 may be based on a type of packet, a role of a user, data associated with the function(s) 208, and/or feedback received from the computing resource network 102. While the flow described below pertains to a packet terminating at a processing workload, the flow may be implemented and based on a packet being modified by a processing workload.

For example, a processing pipeline 206 may include three processing functions 208 (function A 208(1), function B 208(2), and function C 208(N)). It should be appreciated that a processing pipeline 206 may include any number of processing functions 208, and the three processing functions 208 of the processing pipeline 206 as discussed herein is merely exemplary. The functions(s) 208 included in the processing pipeline 206 may be configured as a service chain. Traditionally, in cloud-native environments, these functions 208 may be chained together in a relatively static nature, meaning, for example, that a packet may traverse these functions 208 in the same order (e.g., function A 208(1) first, function B 208(2) second, and then function C 208(N) last). However, when the network admin 116 applies a user-defined policy 114 to the computing resource network 102, and optimized processing pipeline 206 may be determined.

At "1," a network admin 116 may send a policy 114 over one or more network(s) 118 to a computing resource network 102. In some examples, the policy 114 may be received by the policy evaluation engine 106. In some examples, the user-defined policy 114 may indicate at least a first probability that the packet will terminate at function A 208(1), a second probability that the packet will terminate at function B 208(2), and/or a third probability that the packet will terminate at function C 208(N). In some examples, the flow may proceed from "1" to "2." Additionally, or alternatively, the flow may proceed from "1" to "3."

At "2," the policy evaluation engine 106 may collect telemetry data from the programmable NIC 204. In some examples, the programmable NIC 204 may include an agent executing thereon configured to collect and send the telemetry data to the policy evaluation engine 106. In some examples, the telemetry data may include metadata associated with the individual function(s) 208 associated with the processing pipeline 206. In some examples, the telemetry data may provide an indication of how often a packet terminates at a given function 208 in the processing pipeline 206 (e.g., a number of times a packet has terminated at a given function 208, a percentage indicating how often a packet may be terminated at a given function, etc.).

At "3," the policy evaluation engine 106 may use a prediction engine 108 to determine an order for the functions 208 in the processing pipeline 206. In some examples, the policy evaluation engine 106 and/or the prediction engine 108 may determine the order based on the policy 114, the telemetry data collected from the programmable NIC 204, and/or a combination of the two. In some examples, the policy evaluation engine 106, using the prediction engine 108, may then utilize the policy 114 to determine the best probabilistic outcome of a particular order of the functions 208 in the processing pipeline 206 that results in the lowest computational costs based on the respective probabilities that a given packet will be dropped by one of the earlier functions 208 in the processing pipeline 206.

For example, the policy evaluation engine 106, utilizing the prediction engine 108, may determine that the third probability that the packet will terminate at function C 208(N) is greater than the first probability and/or the second probability. Accordingly, the policy evaluation engine 106, using the prediction engine 108, may configure the order of the processing pipeline 206 such that function C 208(N) may be the last function 208 that will process the packet in the processing pipeline 206. Additionally, or alternatively, the policy evaluation engine 106, utilizing the prediction engine 108, may determine that the second probability is greater than the first probability. Accordingly, the policy evaluation engine 106, using the prediction engine 108 may configure the processing pipeline 206 such that function A 208(1) may be the first function and function B 208(2) may be the second function that will process the packet in the processing pipeline 206.

As such, the policy evaluation engine 106 may determine a first order of the functions 208 in the processing pipeline 206 such that the packet is to be processed first by function A 208(1), then by function B 208(2), and then by function C 208(N). Additionally, or alternatively, the telemetry data may be considered in view of a user-defined policy 114 such that an order indicated by a user-defined policy 114 may be changed based on the telemetry data.

For example, the policy evaluation engine 106, using the prediction engine 108, may determine that the telemetry data indicates that the number of packets that have terminated at function C 208(N) is less than the number of packets that have terminated at function A 208(1) and/or the number of packets that have terminated at function B 208(2). Additionally, or alternatively, the policy evaluation engine 106, using the prediction engine 108, may determine that the number of packets that have terminated at function B 208(2) is less than the number of packets that have terminated at function A 208(1). Accordingly, the policy evaluation engine 106 may determine a second order of the functions 208 for processing the packet through the processing pipeline 208, in place of the first order, such that the processing pipeline 206 is configured to process the packet first by function C 208(N), then by function B 208(2), and finally by function A 208(1).

At "4," the intelligent routing engine 104 may then configure and/or utilize the processing pipeline 206 to process the packet through the processing pipeline 206 such that the packet is processed by the respective functions 208 according to the processing pipeline order (e.g., first by function C 208(N), second by function B 208(2), and last by function A 208(1)). When the intelligent routing engine 104 sends the packet to the programmable NIC 204, the programmable NIC 204 may then decrypt the packet, process the packet through all of the functions 208 in the processing pipeline 206, and then re-encrypt the packet before returning the packet to the intelligent routing engine 104.

Figure 3:
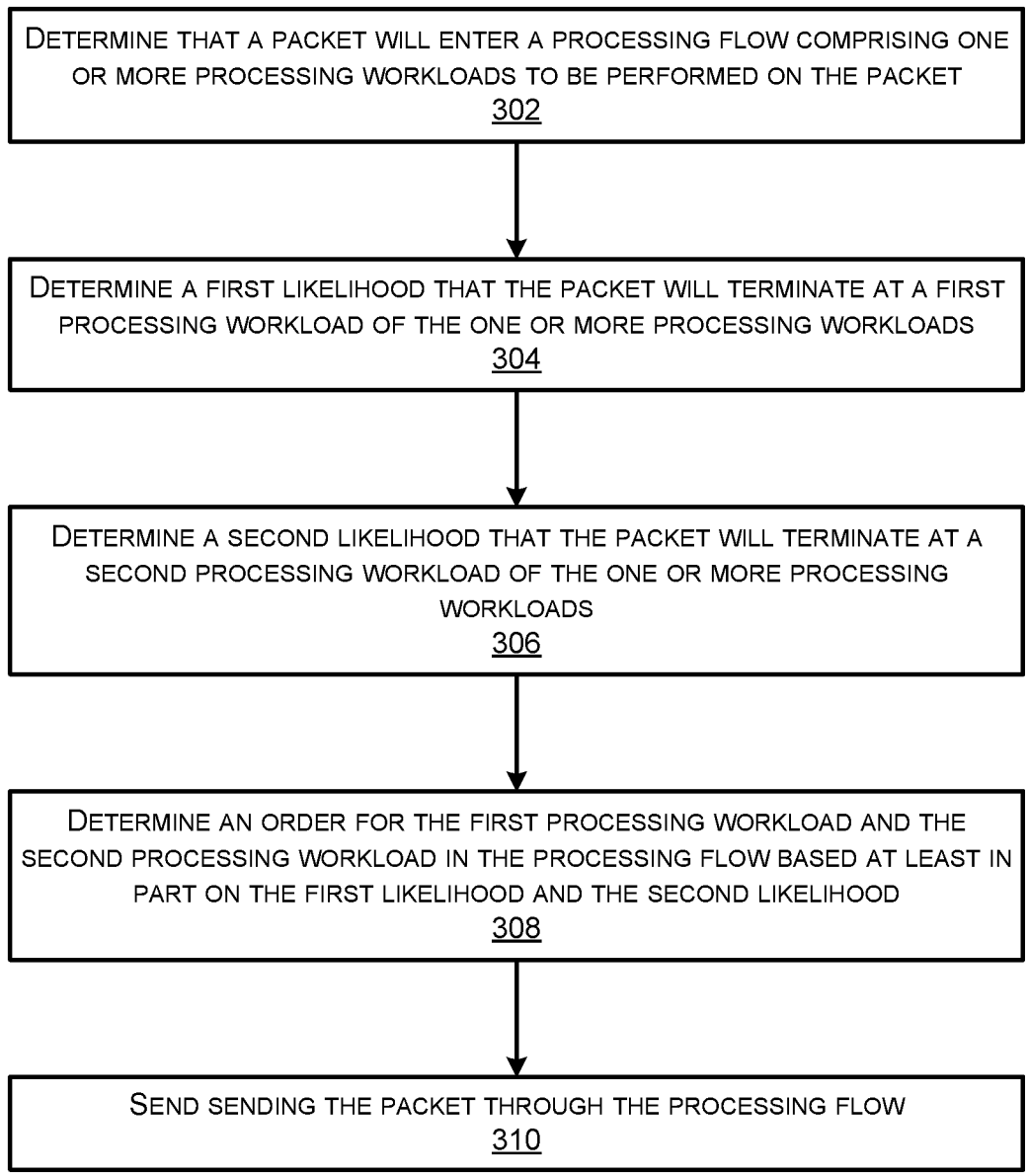
FIG. 3 illustrates a flow diagram of an example method for sending a packet through a processing flow according to an order for one or more processing workloads of the processing flow determined based on a likelihood that the packet will terminate at the respective processing workloads.
Figure 4:
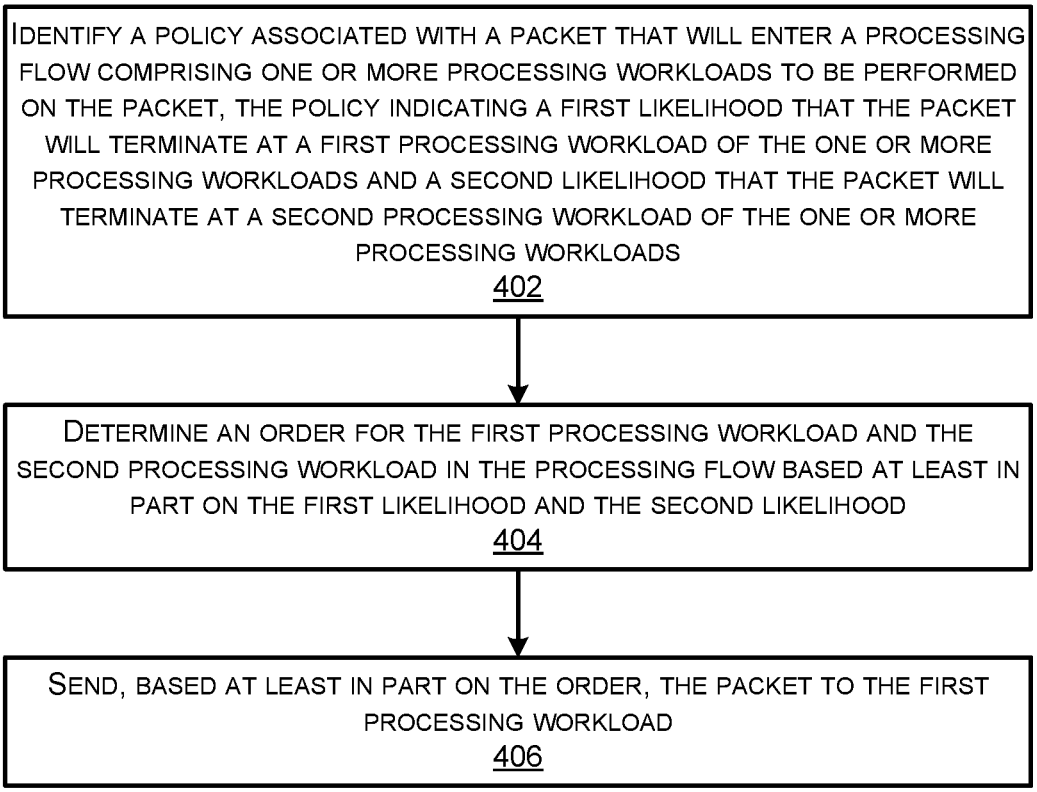
FIG. 4 illustrates a flow diagram of an example method for sending a packet through a processing flow according to an order for one or more processing workloads of the processing flow determined based on a policy indicating a likelihood that the packet will terminate at the respective processing workloads.

FIGS. 3 and 4 illustrate flow diagrams of example methods 300 and 400, and that illustrate aspects of the functions performed at least partly by the computing resource network 102, the intelligent routing engine 104, the policy evaluation engine 106, and/or the prediction engine 108 108 as described in FIGS. 1A, 1B, 2A, and/or 2B. The logical operations described herein with respect to FIGS. 3 and 4 may be implemented (1) as a sequence of computer-implemented acts or program modules running on a computing system and/or (2) as interconnected machine logic circuits or circuit modules within the computing system. In some examples, the method(s) 300 and 400 may be performed by a system comprising one or more processors and one or more non-transitory computer-readable media storing computer-executable instructions that, when executed by the one or more processors, cause the one or more processors to perform the method(s) 300 and 400.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for sending a packet through a processing flow according to an order for one or more processing workloads of the processing flow determined based on a likelihood that the packet will terminate at and/or be modified by the respective processing workloads. In some examples, the processing flow and/or the processing workloads may correspond to the processing flow 110 and/or the processing workloads 112 as described with respect to FIGS. 1A and/or 1B. Additionally, or alternatively, the processing flow and/or the processing workloads may correspond to the processing pipeline 206 and/or the functions 208 as described with respect to FIGS. 2A and/or 2B.

At 302, the method 300 may include determining that a packet will enter a processing flow comprising one or more processing workloads to be performed on the packet. In some examples, a user associated with an enterprise may initiate a packet transmission and determining the packet will enter the processing flow may be based at least in part on a configuration by the enterprise.

At 304, the method 300 may include determining a first likelihood that the packet will terminate at a first processing workload of the one or more processing workloads. Additionally, or alternatively, at 304, the method 300 may include determining a first likelihood that the packet will be modified by a first processing workload of the one or more processing workloads. In some examples the first likelihood may be determined based on a user defined policy, such as, for example, the user-defined policy 114 as described with respect to FIGS. 1A, 1B, 2A, and/or 2B.

At 306, the method 300 may include determining a second likelihood that the packet will terminate at a second processing workload of the one or more processing workloads. Additionally, or alternatively, at 306, the method 300 may include determining a second likelihood that the packet will be modified by a second processing workload of the one or more processing workloads. In some examples the second likelihood may be determined based on a user defined policy, such as, for example, the user-defined policy 114 as described with respect to FIGS. 1A, 1B, 2A, and/or 2B.

At 308, the method 300 may include determining an order for the first processing workload and the second processing workload in the processing flow based at least in part on the first likelihood and the second likelihood. In some examples, the order may be determined using a prediction engine, such as, for example, the prediction engine 108 as described with respect to FIGS. 1A and/or 1B, to determine the best probabilistic outcome of a particular order of routing between the workloads offering services that results in the lowest computational costs based on the respective probabilities that a given packet will be terminated and/or modified by one of the earlier workloads in the processing flow.

At 310, the method 300 may include sending the packet through the processing flow. In some examples, sending the packet through the processing flow may include utilizing the processing flow order to route the packet through the processing flow such that the packet is sent to the respective workloads according to the processing flow order (e.g., first to the first processing workload and second to the second processing workload). At each processing workload, a service may be performed on the packet before being routed to the next processing workload in the processing flow.

Additionally, or alternatively, the method 300 may include receiving a user defined policy associated with the packet, the user defined policy indicating the first likelihood and the second likelihood. Additionally, or alternatively, the method 300 may include determining the order for the first processing workload and the second processing workload in the processing flow based at least in part on the user defined policy.

Additionally, or alternatively, the method 300 may include receiving, from a first agent executing on the first processing workload, first data indicating a first number of packets terminated at the first processing workload. Additionally, or alternatively, the method 300 may include receiving, from a second agent executing on the second processing workload, second data indicating a second number of packets terminated at the second processing workload. Additionally, or alternatively, the method 300 may include determining the first likelihood based at least in part on the first data. Additionally, or alternatively, the method 300 may include determining the second likelihood based at least in part on the second data.

In some examples, the order may be a first order. Additionally, or alternatively, the method 300 may include receiving a user defined policy associated with the packet, the user defined policy indicating the first likelihood and the second likelihood, wherein the first order is determined based at least in part on the user defined policy. Additionally, or alternatively, the method 300 may include Additionally, or alternatively, the method 300 may include receiving, from a first agent executing on the first processing workload, first data indicating a first number of packets terminated at and/or modified by the first processing workload. Additionally, or alternatively, the method 300 may include receiving, from a second agent executing on the second processing workload, second data indicating a second number of packets terminated at and/or modified by the second processing workload. Additionally, or alternatively, the method 300 may include determining a third likelihood that the packet will terminate at and/or be modified by the first processing workload based at least in part on the first data. Additionally, or alternatively, the method 300 may include determining a fourth likelihood that the packet will terminate at and/or be modified by the second processing workload based at least in part on the second data. Additionally, or alternatively, the method 300 may include determining a second order for the first processing workload and the second processing workload based at least in part on the third likelihood and the fourth likelihood, wherein the second order is different from the first order. Additionally, or alternatively, the method 300 may include sending the packet through the processing flow according to the second order.

In some examples, the processing flow may include a cloud native service chaining environment. Additionally, or alternatively, the first processing workload may be a first service in the service chaining environment. Additionally, or alternatively, the second processing workload may be a second service in the service chaining environment.

In some examples, the processing flow includes a packet processing pipeline executing on a programmable network interface controller (NIC). Additionally, or alternatively, the first processing workload is a first packet processing function of the packet processing pipeline. Additionally, or alternatively, the second processing workload is a second packet processing function of the packet processing pipeline.

Additionally, or alternatively, the method 300 may include determining a first latency associated with the first processing workload, the first latency being based at least in part on a first amount of time taken by the first processing workload to process the packet. Additionally, or alternatively, the method 300 may include determining a second latency associated with the second processing workload, the second latency being based at least in part on a second amount of time taken by the second processing workload to process the packet, the second amount of time being different from the first amount of time. Additionally, or alternatively, the method 300 may include determining the order for the first processing workload and the second processing workload in the processing flow based at least in part on the first latency and the second latency.

FIG. 4 illustrates a flow diagram of an example method 400 for sending a packet through a processing flow according to an order for one or more processing workloads of the processing flow determined based on a policy indicating a likelihood that the packet will terminate at and/or be modified by the respective processing workloads. In some examples, the processing flow and/or the processing workloads may correspond to the processing flow 110 and/or the processing workloads 112 as described with respect to FIGS. 1A and/or 1B. Additionally, or alternatively, the processing flow and/or the processing workloads may correspond to the processing pipeline 206 and/or the functions 208 as described with respect to FIGS. 2A and/or 2B.

At 402, the method 400 may include identifying a policy associated with a packet that will enter a processing flow comprising one or more processing workloads to be performed on the packet. In some examples, the policy may indicate a first likelihood that the packet will terminate at a first processing workload of the one or more processing workloads and/or a second likelihood that the packet will terminate at a second processing workload of the one or more processing workloads. Additionally, or alternatively, the policy may indicate a first likelihood that the packet will be modified by the first processing workload of the one or more processing workloads and/or a second likelihood that the packet will terminate at a second processing workload of the one or more processing workloads. In some examples the policy may correspond to the user-defined policy 114 as described with respect to FIGS. 1A, 1B, 2A, and/or 2B.

At 404, the method 400 may include determining an order for the first processing workload and the second processing workload in the processing flow. In some examples, the order may be based at least in part on the first likelihood and/or the second likelihood. In some examples, the order may be determined using a prediction engine, such as, for example, the prediction engine 108 as described with respect to FIGS. 1A and/or 1B, to determine the best probabilistic outcome of a particular order of routing between the workloads offering services that results in the lowest computational costs based on the respective probabilities that a given packet will be terminated and/or modified by one of the earlier workloads in the processing flow.

At 406, the method 400 may include sending the packet to the first processing workload. In some examples, sending the packet to the first processing workload may be based at least in part on the order. In some examples, sending the packet through the processing flow may include utilizing the processing flow order to route the packet through the processing flow such that the packet is sent to the respective workloads according to the processing flow order (e.g., first to the first processing workload and second to the second processing workload). At each processing workload, a service may be performed on the packet before being routed to the next processing workload in the processing flow.

Additionally, or alternatively, the method 400 may include determining that the second likelihood is greater than the first likelihood. In some examples, determining the order for the first processing workload and/or the second processing workload in the processing flow may be based at least in part on determining that the second likelihood is greater than the first likelihood.

In some examples, the order may be a first order. Additionally, or alternatively, the method 400 may include receiving, from a first agent executing on the first processing workload, first data indicating a first number of packets terminated at and/or modified by the first processing workload. Additionally, or alternatively, the method 400 may include receiving, from a second agent executing on the second processing workload, second data indicating a second number of packets terminated at and/or modified by the second processing workload. Additionally, or alternatively, the method 400 may include determining a third likelihood that the packet will terminate at and/or be modified by the first processing workload based at least in part on the first data. Additionally, or alternatively, the method 400 may include determining a fourth likelihood that the packet will terminate at and/or be modified by the second processing workload based at least in part on the second data. Additionally, or alternatively, the method 400 may include determining a second order for the first processing workload and the second processing workload in the processing flow based at least in part on the third likelihood and the fourth likelihood.

In some examples, the processing flow may include a cloud native service chaining environment. In some examples, the first processing workload may be a first service in the service chaining environment. In some examples, the second processing workload may be a second service in the service chaining environment.

In some examples, the processing flow may include a packet processing pipeline executing on a programmable network interface controller (NIC). Additionally, or alternatively, the first processing workload may be a first packet processing function of the packet processing pipeline. Additionally, or alternatively, the second processing workload may be a second packet processing function of the packet processing pipeline.

Additionally, or alternatively, the method 400 may include determining a first latency associated with the first processing workload. In some examples, the first latency may be based at least in part on a first amount of time taken by the first processing workload to process the packet. Additionally, or alternatively, the method 400 may include determining a second latency associated with the second processing workload. In some examples, the second latency may be based at least in part on a second amount of time taken by the second processing workload to process the packet. Additionally, or alternatively, the second amount of time may be different from the first amount of time. Additionally, or alternatively, the method 400 may include determining the order for the first processing workload and the second processing workload in the processing flow. In some examples, the order may be determined based at least in part on the first latency and the second latency.

Figure 5:
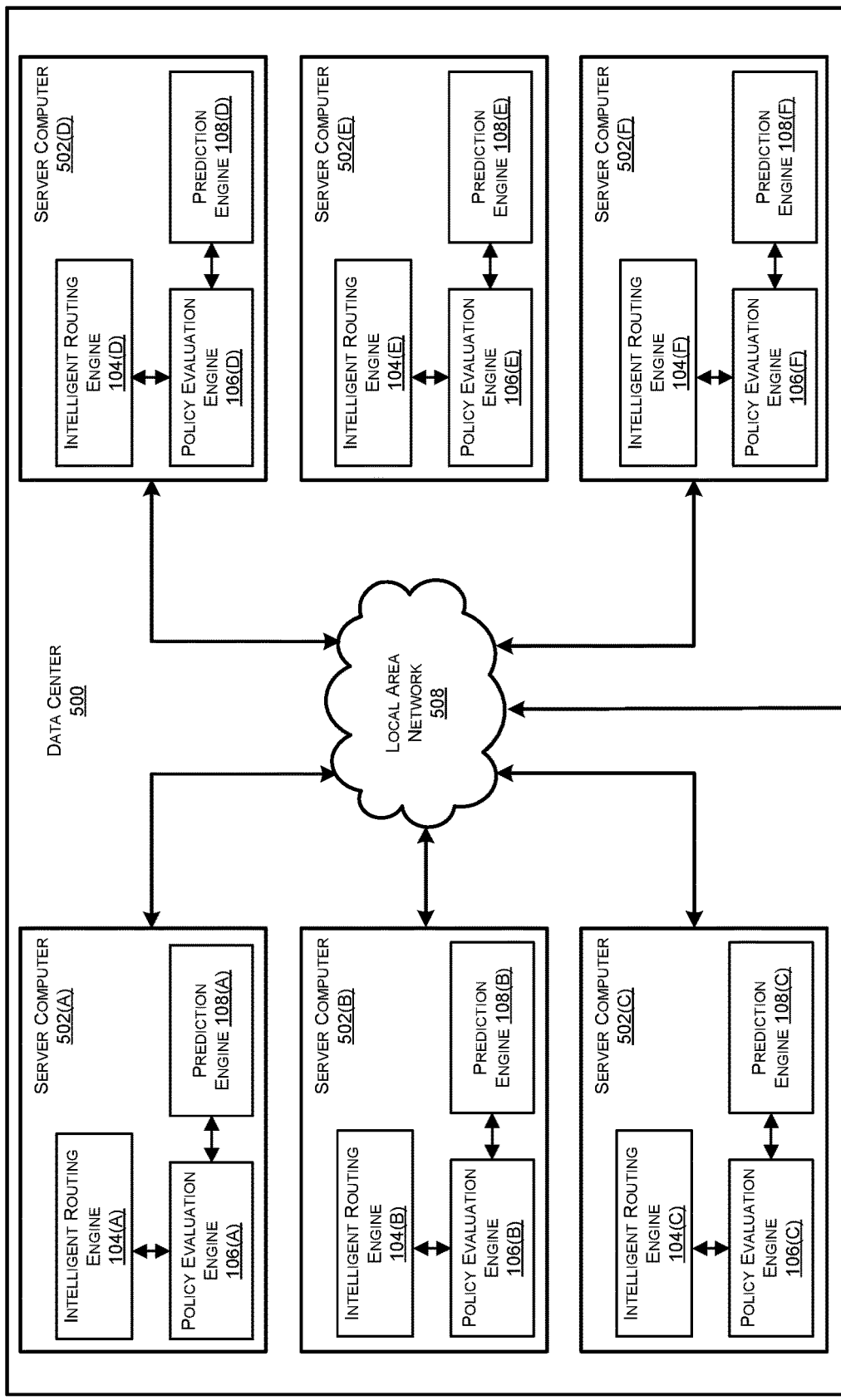
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several server computers 502A-502E (which might be referred to herein singularly as "a server computer 502" or in the plural as "the server computers 502") for providing computing resources. In some examples, the server computers 502 may include, or correspond to, the servers described herein with respect to FIGS. 1A, 1B, 2A, and/or 2B.

The server computers 502 can be standard tower, rackmount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 502 can also be configured to execute a resource manager capable of instantiating and/or managing the computing resources. In the case of VM instances, for example, the resource manager can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate LAN 508 is also utilized to interconnect the server computers 502A-502E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502E in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more workloads 112, programmable NICs 204, intelligent routing engines 104, policy evaluation engines 106, and/or prediction engines 108, provisioned across a set or cluster of servers 502.

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the computing resource network 102 may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
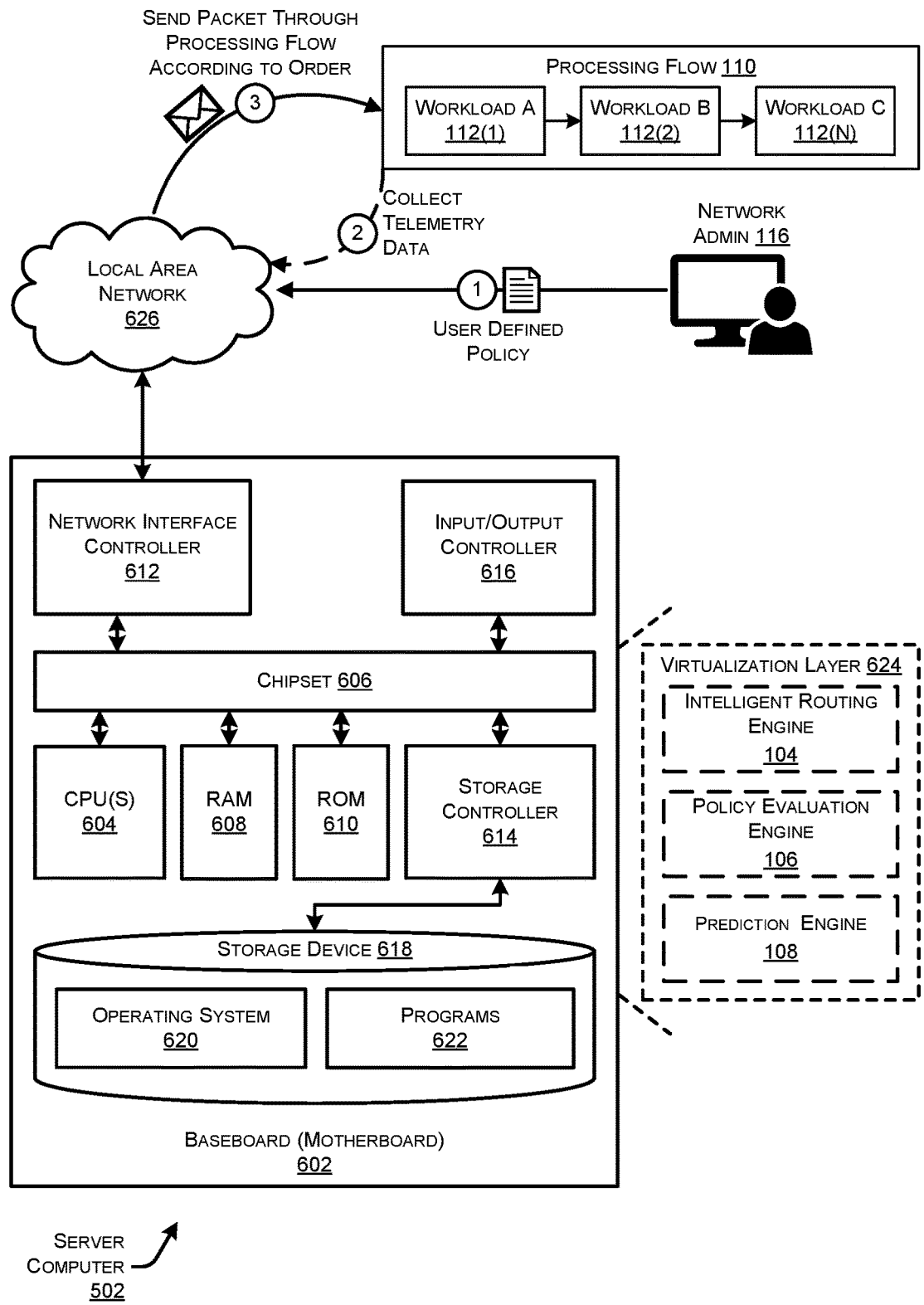
FIG. 6 is a computer architecture diagram showing an illustrative computer hardware architecture for implementing a server device that can be utilized to implement aspects of the various technologies presented herein.

FIG. 6 shows an example computer architecture for a computing device (or network switch) 502 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 502 may, in some examples, correspond to a physical server described herein with respect to FIGS. 1A, 1B, 2A, and/or 2B.

The computing device 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 502. The chipset 606 can further provide an interface to a computer-readable storage medium such as a read-only memory ("ROM") 610 or non-volatile RAM ("NVRAM") for storing basic routines that help to startup the computing device 502 and to transfer information between the various components and devices. The ROM 610 or NVRAM can also store other software components necessary for the operation of the computing device 502 in accordance with the configurations described herein.

The computing device 502 can operate in a networked environment using logical connections to remote computing devices and computer systems through a network, such as the network 626. The chipset 606 can include functionality for providing network connectivity through a NIC 612, such as a gigabit Ethernet adapter. The NIC 612 is capable of connecting the computing device 502 to other computing devices over the network 626 (or 118). It should be appreciated that multiple NICs 612 can be present in the computing device 502, connecting the computer to other types of networks and remote computer systems.

The computing device 502 can be connected to a storage device 618 that provides non-volatile storage for the computing device 502. The storage device 618 can store an operating system 620, programs 622, and data, which have been described in greater detail herein. The storage device 618 can be connected to the computing device 502 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 502 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 502 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 502 can further read information from the storage device 618 by detecting the physical states or characteristics of one or more particular locations within the physical storage units.

In addition to the mass storage device 618 described above, the computing device 502 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 502. In some examples, the operations performed by the computing resource network 102, and or any components included therein, may be supported by one or more devices similar to computing device 502. Stated otherwise, some or all of the operations performed by the computing resource network 102, and or any components included therein, may be performed by one or more computing device 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 502. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 618 can store other system or application programs and data utilized by the computing device 502.

In one embodiment, the storage device 618 or other computer-readable storage media is encoded with computer-executable instructions which, when loaded into the computing device 502, transform the computer from a general-purpose computing system into a special-purpose computer capable of implementing the embodiments described herein. These computer-executable instructions transform the computing device 502 by specifying how the CPUs 604 transition between states, as described above. According to one embodiment, the computing device 502 has access to computer-readable storage media storing computer-executable instructions which, when executed by the computing device 502, perform the various processes described above with regard to FIGS. 1-4. The computing device 502 can also include computer-readable storage media having instructions stored thereupon for performing any of the other computer-implemented operations described herein.

The computing device 502 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 502 might not include all of the components shown in FIG. 6, can include other components that are not explicitly shown in FIG. 6, or might utilize an architecture completely different than that shown in FIG. 6.

The server computer 502 may support a virtualization layer 624, such as one or more services associated with the computing resource network 102, such as, for example, the intelligent routing engine 104, the policy evaluation engine 106, and/or the prediction engine 108 executing on the server computer 502. In some examples, the virtualization layer 624 may be supported by a hypervisor that provides one or more virtual machines running on the server computer 502 to perform functions described herein. The virtualization layer 624 may generally support a virtual resource that performs at least portions of the techniques described herein. A network admin 116 may configure a user-defined policy including respective probabilities that a packet will terminate at and/or modified by a given workload 112 of a processing flow 110. The policy evaluation engine 106 may collect telemetry data from the individual workloads 112 of the processing flow. The policy evaluation engine 106 may use a prediction engine 108 to determine an order of the processing flow 110 based on the policy and/or the telemetry data, and the intelligent routing engine 104 may then route the packet to the workloads 112 in the processing flow 110 based on the order, where each workload 112 may offer a service to be performed on the packet.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining that a packet will enter a processing flow comprising one or more processing workloads to be performed on the packet;
   receiving a first policy associated with the packet, the first policy being user defined and indicating a first likelihood that the packet will terminate at a first processing workload of the one or more processing workloads, and a second likelihood that the packet will terminate at a second processing workload of the one or more processing workloads;
   determining a first order for the first processing workload and the second processing workload in the processing flow based at least in part on the first likelihood and the second likelihood;
   receiving, from a first agent executing on the first processing workload, first data indicating a first number of packets terminated at the first processing workload;
   receiving, from a second agent executing on the second processing workload, second data indicating a second number of packets terminated at the second processing workload;
   determining a third likelihood that the packet will terminate at the first processing workload based at least in part on the first data;
   determining a fourth likelihood that the packet will terminate at the second processing workload based at least in part on the second data;
   determining a second order for the first processing workload and the second processing workload based at least in part on the third likelihood and the fourth likelihood, wherein the second order is different from the first order; and
   sending the packet through the processing flow according to the second order.

2. The method of claim 1, further comprising determining a third order for the first processing workload and the second processing workload in the processing flow based at least in part on the first policy, the third likelihood, and the fourth likelihood.

3. The method of claim 1, further comprising:
   receiving, from the first agent executing on the first processing workload, third data indicating a third number of packets modified at the first processing workload;
   receiving, from the second agent executing on the second processing workload, fourth data indicating a fourth number of packets modified at the second processing workload;
   determining the first likelihood based at least in part on the third data; and determining the second likelihood based at least in part on the fourth data.

4. The method of claim 1, further comprising:
receiving a second policy associated with the packet, the second policy being user defined and indicating a fifth likelihood that the packet will be modified at the first processing workload and sixth likelihood that the packet will be modified at the second processing workload;
determining a third order for the first processing workload and the second processing workload based at least in part on the fifth likelihood and the sixth likelihood, wherein the third order is different from at least one of the first order or the second order; and
sending the packet through the processing flow according to the third order.

5. The method of claim 1, wherein:
the processing flow includes a cloud native service chaining environment;
the first processing workload is a first service in the service chaining environment; and
the second processing workload is a second service in the service chaining environment.

6. The method of claim 1, wherein:
the processing flow includes a packet processing pipeline executing on a programmable network interface controller (NIC);
the first processing workload is a first packet processing function of the packet processing pipeline; and
the second processing workload is a second packet processing function of the packet processing pipeline.

7. The method of claim 1, further comprising:
determining a first latency associated with the first processing workload, the first latency being based at least in part on a first amount of time taken by the first processing workload to process the packet;
determining a second latency associated with the second processing workload, the second latency being based at least in part on a second amount of time taken by the second processing workload to process the packet, the second amount of time being different from the first amount of time; and
determining the second order for the first processing workload and the second processing workload in the processing flow based at least in part on the first latency and the second latency.

8. A system comprising:
one or more processors; and
one or more computer-readable media storing computer-executable instructions that, when executed by the one or more processors, cause the one or more processors to perform operations comprising:
  determining that a packet will enter a processing flow comprising one or more processing workloads to be performed on the packet;
  receiving a user defined policy associated with the packet, the user defined policy indicating a first likelihood that the packet will be modified at a first processing workload of the one or more processing workloads and a second likelihood that the packet will be modified at a second processing workload of the one or more processing workloads;
  determining a first order for the first processing workload and the second processing workload in the processing flow based at least in part on the user defined policy;
  receiving, from a first agent executing on the first processing workload, first data indicating a first number of packets modified at the first processing workload;
  determining a third likelihood that the packet will be modified at the first processing workload based at least in part on the first data;
  determining a first latency associated with the first processing workload, the first latency being based at least in part on a first amount of time taken by the first processing workload to process the packet;
  receiving, from a second agent executing on the second processing workload, second data indicating a second number of packets modified at the second processing workload;
  determining a fourth likelihood that the packet will be modified at the second processing workload based at least in part on the second data;
  determining a second latency associated with the second processing workload, the second latency being based at least in part on a second amount of time taken by the second processing workload to process the packet;
  determining a second order for the first processing workload and the second processing workload in the processing flow based at least in part on the third likelihood, the fourth likelihood, the first latency, and the second latency; and
  sending the packet through the processing flow according to the second order.

9. The system of claim 8, further comprising:
receiving, from the first agent executing on the first processing workload, third data indicating a third number of packets terminated at the first processing workload;
receiving, from the second agent executing on the second processing workload, fourth data indicating a fourth number of packets terminated at the second processing workload;
determining the first likelihood based at least in part on the third data; and
determining the second likelihood based at least in part on the fourth data.

10. The system of claim 8, the system further comprising a cloud native service chaining environment, wherein the first processing workload is a first service in the service chaining environment and the second processing workload is a second service in the service chaining environment.

11. The system of claim 8, the system further comprising a programmable network interface controller (NIC) configured to execute a packet processing pipeline, wherein the first processing workload is a first packet processing function of the packet processing pipeline and the second processing workload is a second packet processing function of the packet processing pipeline.

12. The system of claim 8, the operations further comprising determining, based at least in part on the first likelihood and the second likelihood, that the packet is to be pre-processed by the first processing workload prior to the second processing workload processing the packet, wherein determining the order is based at least in part on determining that the packet is to be pre-processed by the first processing workload prior to the second processing workload processing the packet.

13. The system of claim 8, the operations further comprising determining a third order for the first processing workload and the second processing workload in the processing flow based at least in part on the user defined policy and at least one of the third likelihood, the fourth likelihood, the first latency, or the second latency.

14. One or more non-transitory computer-readable media storing instructions that, when executed, cause one or more processors to perform operations comprising:
   determining that a packet will enter a processing flow comprising one or more processing workloads to be performed on the packet;
   receiving a first policy associated with the packet, the first policy being user defined and indicating a first likelihood that the packet will terminate at a first processing workload of the one or more processing workloads, and a second likelihood that the packet will terminate at a second processing workload of the one or more processing workloads;
   determining a first order for the first processing workload and the second processing workload in the processing flow based at least in part on the first likelihood and the second likelihood;
   receiving, from a first agent executing on the first processing workload, first data indicating a first number of packets terminated at the first processing workload;
   receiving, from a second agent executing on the second processing workload, second data indicating a second number of packets terminated at the second processing workload;
   determining a third likelihood that the packet will terminate at the first processing workload based at least in part on the first data;
   determining a fourth likelihood that the packet will terminate at the second processing workload based at least in part on the second data;
   determining a second order for the first processing workload and the second processing workload based at least in part on the third likelihood and the fourth likelihood, wherein the second order is different from the first order; and
   sending the packet through the processing flow according to the second order.

15. The one or more non-transitory computer-readable media of claim 14, the operations further comprising determining a third order for the first processing workload and the second processing workload in the processing flow based at least in part on the first policy, the third likelihood, and the fourth likelihood.

16. The one or more non-transitory computer-readable media of claim 14, the operations further comprising:
   receiving, from the first agent executing on the first processing workload, third data indicating a third number of packets modified at the first processing workload;
   receiving, from the second agent executing on the second processing workload, fourth data indicating a fourth number of packets modified at the second processing workload;
   determining the first likelihood based at least in part on the third data; and
   determining the second likelihood based at least in part on the fourth data.

17. The one or more non-transitory computer-readable media of claim 14, the operations further comprising:
   receiving a second policy associated with the packet, the second policy being user defined and indicating a fifth likelihood that the packet will be modified at the first processing workload and sixth likelihood that the packet will be modified at the second processing workload;
   determining a third order for the first processing workload and the second processing workload based at least in part on the fifth likelihood and the sixth likelihood, wherein the third order is different from at least one of the first order or the second order; and
   sending the packet through the processing flow according to the third order.

18. The one or more non-transitory computer-readable media of claim 14, wherein:
   the processing flow includes a cloud native service chaining environment;
   the first processing workload is a first service in the service chaining environment; and
   the second processing workload is a second service in the service chaining environment.

19. The one or more non-transitory computer-readable media of claim 14, wherein:
   the processing flow includes a packet processing pipeline executing on a programmable network interface controller (NIC);
   the first processing workload is a first packet processing function of the packet processing pipeline; and
   the second processing workload is a second packet processing function of the packet processing pipeline.

20. The one or more non-transitory computer-readable media of claim 14, the operations further comprising:
   determining a first latency associated with the first processing workload, the first latency being based at least in part on a first amount of time taken by the first processing workload to process the packet;
   determining a second latency associated with the second processing workload, the second latency being based at least in part on a second amount of time taken by the second processing workload to process the packet, the second amount of time being different from the first amount of time; and
   determining the second order for the first processing workload and the second processing workload in the processing flow based at least in part on the first latency and the second latency.

* * * * *